US005603486A

United States Patent [19]

Liu

[11] Patent Number: 5,603,486

[45] Date of Patent: Feb. 18, 1997

[54] FRAME-TYPE CAR JACK

[76] Inventor: Yang-chou Liu, 3rd Fl., No. 63-1, Sec. 1, Chang-an E. Road, Taipei, Taiwan

[21] Appl. No.: 528,688

[22] Filed: Sep. 15, 1995

[51] Int. Cl.$^6$ ........................ B60P 1/48

[52] U.S. Cl. ........................ 254/8 B; 254/93 H; 254/124

[58] Field of Search ........................ 254/120, 122, 254/123, 124, 129, 8 B, 93 H; 74/527

[56] References Cited

U.S. PATENT DOCUMENTS

| | | | |
|---|---|---|---|
| 3,806,093 | 4/1974 | Itazu | 254/124 |
| 3,891,108 | 6/1975 | Traficant | 254/122 |
| 4,241,899 | 12/1980 | Kaneko | 254/8 B |
| 4,749,169 | 6/1988 | Pickles | 254/122 |
| 5,016,858 | 5/1991 | Mitchell | 254/122 |
| 5,029,814 | 7/1991 | Liegel et al. | 254/122 |
| 5,211,375 | 5/1993 | Wang | 254/124 |
| 5,433,127 | 7/1995 | Messier | 254/DIG. 1 |

*Primary Examiner*—Robert C. Watson
*Assistant Examiner*—Thomas W. Lynch
*Attorney, Agent, or Firm*—Ross, Clapp, Korn & Montgomery, L.L.P.

[57] ABSTRACT

An improved frame-type, manually-operated hydraulic car jack consists of a base, a pressure release valve, a socket, a lever, a hydraulic oil cylinder, a piston, a pair of pulling bars, a pair of links, a pair of pushing bars, a load-engaging head and a locking rod. A pair of horizontally aligned holes which have a diameter slightly larger than that of the locking rod are defined in the pushing bars. When the car jack is driven to lift a car supported by the car jack to a desired level, the locking rod is inserted into and extended through the holes on the pushing bars thereby to prevent an unintentional lowering of the car jack and the car.

6 Claims, 4 Drawing Sheets

FRAME-TYPE CAR JACK

FIELD OF THE INVENTION

The present invention is related to a car jack, and particularly, to a car jack having an improvement which can prevent an unintended lowering of the jack when it is used for supporting a heavy load, for example, a car. More specifically, the present invention is related to an improved "frame-type" car jack.

BACKGROUND OF THE INVENTION

A variety of types of car jack have been developed over a long time for facilitating a car driver to replace a flat/punctured tire or do necessary maintenance to the car. Among these types of car jack, a so-called "frame-type" car jack is found specially advantageous to carry in a car since it is very compact under a folded state. According to the mechanism for generating the lifting force for the car jack, the "frame-type" car jack can be classified into two kinds: one is a hydraulic frame-type car jack and the other is a threaded frame-type car jack wherein the former can be manually or electrically operated and the latter usually is manually operated.

FIG. 1 shows a conventional frame-type, manually-operated hydraulic car jack 90 which comprises a base 10, a pressure release valve 16, a socket 14, a lever 18, a hydraulic oil cylinder 12, a piston 122, a pair of pulling bars 20, a pair of links 22, a pair of pushing bars 24, and a load-engaging head 26. When an end of the lever 18 is inserted into the socket 14 and has a well-known reciprocating movement relative thereto, due to a hydraulic force, the piston 122 will be lifted. The lift of the piston 122 causes the load-engaging head 26 to also have an upward movement, via the transmission of the pulling bars 20, the links 22, and the pushing bars 24, which are sequentially pivotably connected together and form a frame of the car jack 90 wherein the load-engaging head 26 is pivotably connected to a top end of the pushing bars 24, the links 22 have an end pivotably connected to the base 10 and the pulling bars 20 are pivotably connected to the piston 122.

In addition to the above mentioned manually-operated hydraulic system, the piston 122 can also be lifted by an electrically-operated hydraulic system.

Furthermore, it is obvious to those skilled in the art that in a conventional threaded frame-type car jack, the piston 122 is replaced by a threaded shaft which is lifted or lowered by a rotating action.

However, all of the three types of conventional frame-type car jacks have a common disadvantage that they cannot prevent an unintentional lowering thereof when they are supporting a lifted heavy load, for example, a car. This is particularly true for the hydraulic frame-type car jack since a hydraulic driving mechanism is more unreliable than a threaded driving mechanism although the former is more convenient and easier to operate.

An unintentional lowering of the car jack is very dangerous to the driver who may lift front or rear wheels of the car and crawl into a underside of the car to carry out maintenance or repairs.

Thus, many conventional car jacks having operating manuals clearly require that the driver, when using a car jack like the car jack 90 to lift front wheels of a car 95 as indicated by phantom lines of FIG. 2 of the present application, should also use a fixed supporting stand 91 to support the car 95, thereby to avoid the danger caused by an unintentional lowering of the car jack 90. However, in fact, most drivers will not spend extra money to buy the fixed supporting stand 91 when they are purchasing the car jack 90. Rather, in many cases, they prefer to use a stack of bricks to support the lifted car. Such a support by a stack of bricks is not secure and sometimes may cause a catastrophe.

SUMMARY OF THE INVENTION

It is an objective of the present invention to provide an improved frame-type car jack which can be fixedly locked at any desired lifted level thereby to prevent an unintentional lowering of a heavy load, for example, a car supported by the present invention.

A further objective of the present invention is to provide an improved frame-type car jack which can obviate the necessity to use a fixed supporting stand or a stack of bricks to support the lifted heavy load.

It is a further objective of the present invention to provide an improved car jack which can be very easily operated to be fixedly locked at the desired lifted level.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
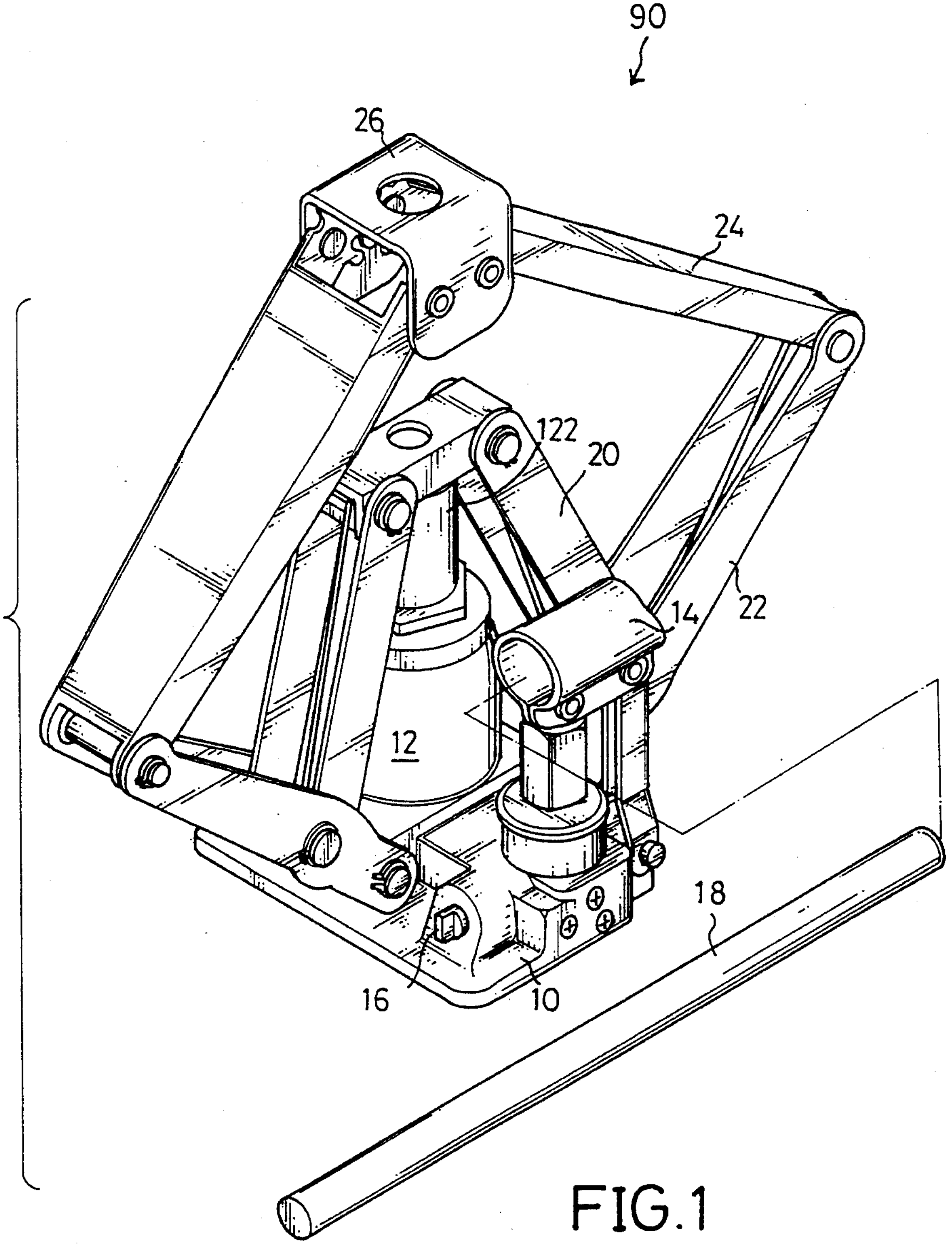
FIG.1 PRIOR ART
FIG. 1 is a perspective view showing a conventional manually-operated hydraulic frame-type car jack.
Figure 2:
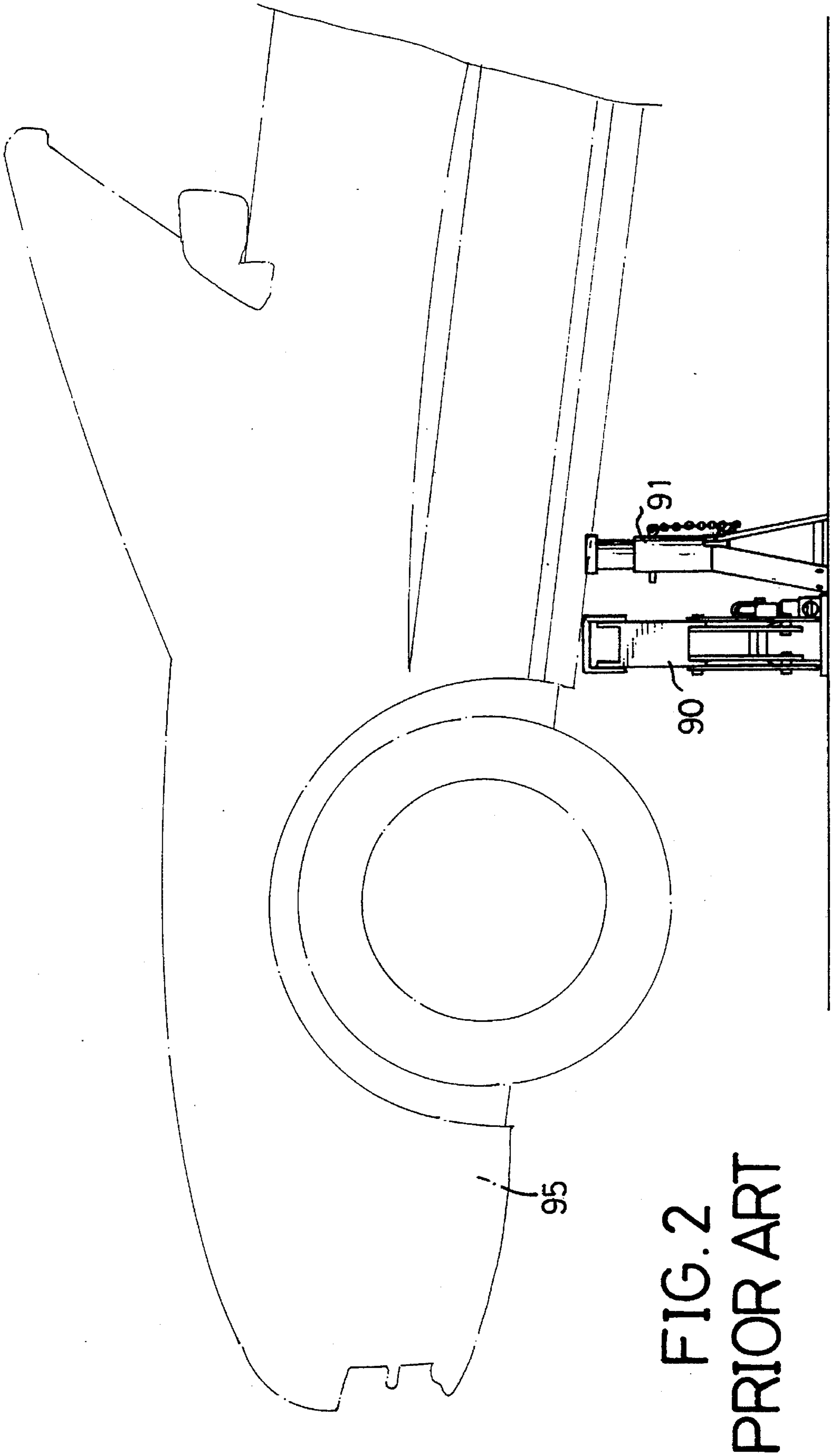
FIG. 2 PRIOR ART
FIG. 2 is a side view showing that when the conventional car jack of FIG. 1 is used to lift a car indicated by phantom lines, a fixed supporting stand is required to give the car a fixed supporting to prevent an unintentional lowering of the car.
Figure 3:
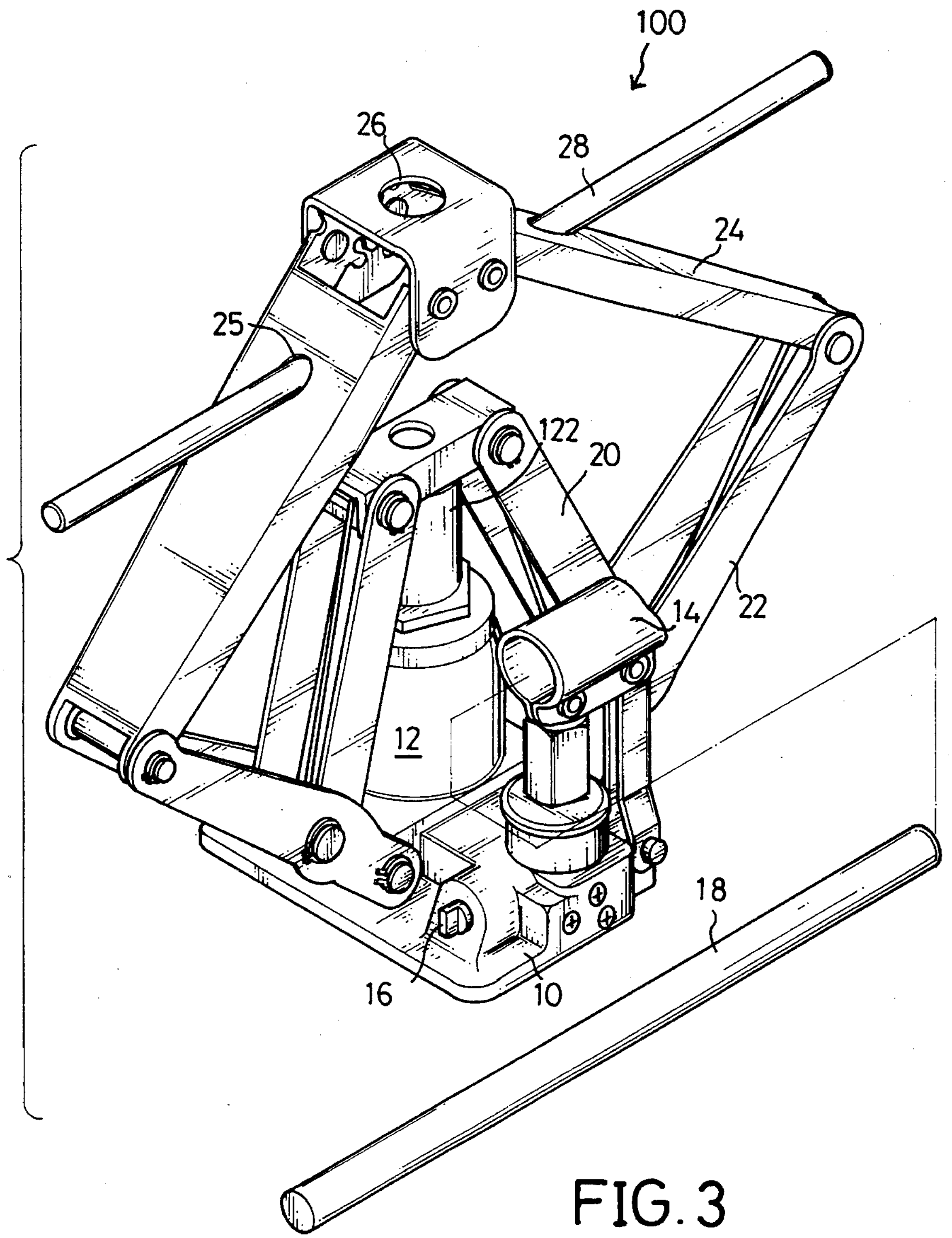
FIG. 3 is a perspective view showing a manually-operated hydraulic frame-type car jack in accordance with the present invention.
Figure 4:
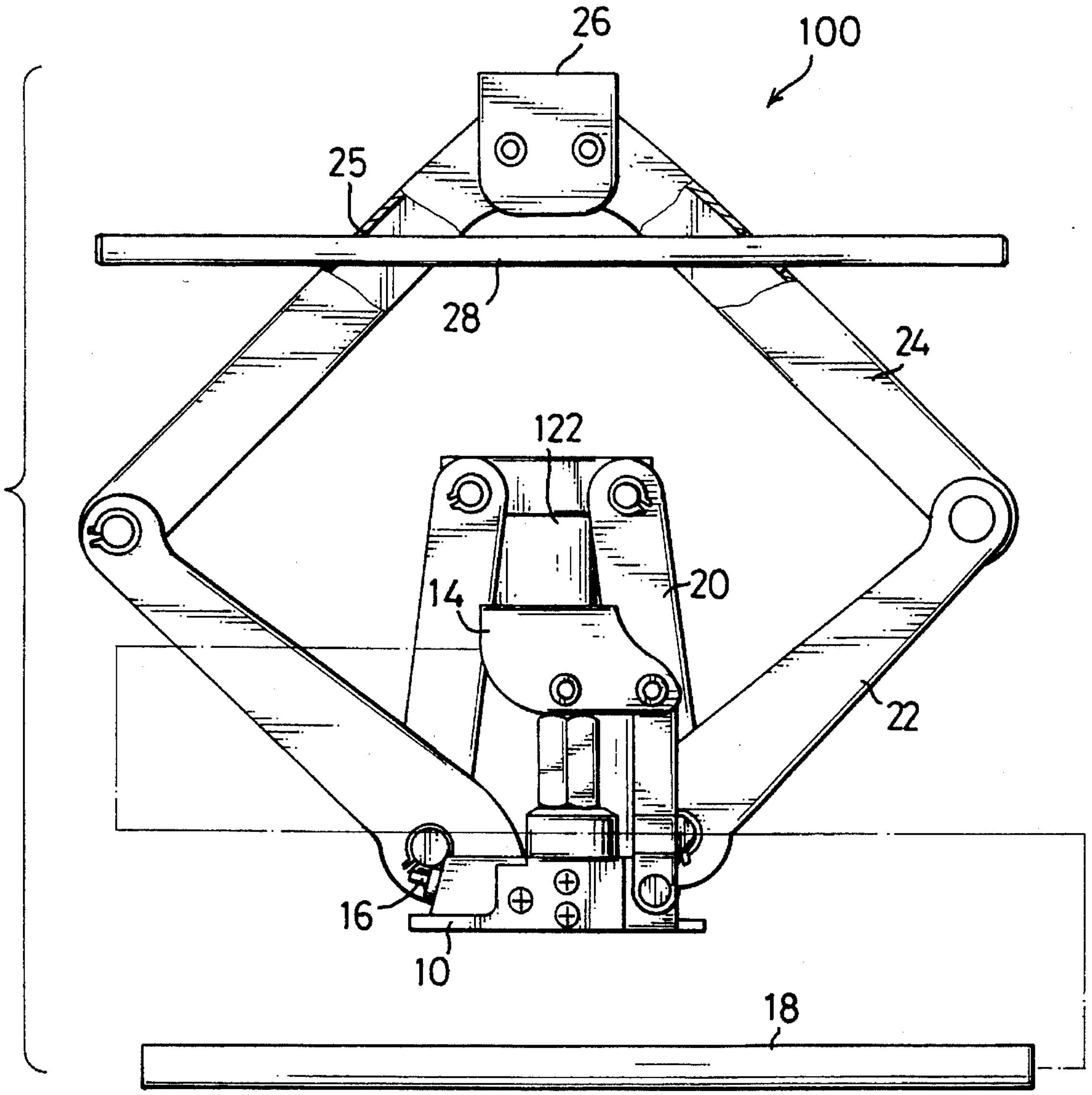
FIG. 4 is a front view of FIG. 3 with a part being cut away to show the details concerning the improvement of the present invention.

Referring to FIGS. 3 and 4, a frame-type, manually-operated hydraulic car jack 100 in accordance with the present invention, similar to the conventional car jack 90 as shown in FIG. 1, basically also consists of a base 10, a pressure release valve 16, a socket 14, a lever 18, a hydraulic oil cylinder 12, a piston 122, a pair of pulling bars 20, a pair of links 22, a pair of pushing bars 24, and a load-engaging head 26. When an end of the lever 18 is inserted into the socket 14 and has a well-known reciprocating movement relative thereto, due to a hydraulic force, the piston 122 will be lifted. The lift of the piston 122 causes the load-engaging head 26 to also have an upward movement, via the transmission of the pulling bars 20, the links 22, and the pushing bars 24, which are sequentially pivotably connected together and form a frame of the present car jack 100 wherein the load-engaging head 26 is pivotably connected to a top end of the pushing bars 24, the links 22 have an end pivotably connected to the base 10 and the pulling bars 20 are pivotably connected to the piston 122.

However, the present car jack 100 further provides a pair of aligned holes 25 defined in the pushing bars 24 and a locking rod 28, wherein the holes 25 have a diameter slightly larger than a diameter of the locking rod 28. The locking rod 28 has a length that is sufficient to extend through the two holes 25 when the present car jack 100 is operated to any required position.

When a heavy load, for example, a car has been lifted by the present car jack 100 by a known operating manner to a desired level,.the locking rod 28 is then inserted into and extended through the holes 25 defined in the pushing bars 24. Thereafter, if a failure occurs to the present car jack 100, for example, a leakage of hydraulic oil or an unintentional opening of the release valve 16 to cause an unintentional lowering of the present car jack 100, the lowering thereof can be very quickly stopped, since, then, a fixed engagement will happen between the locking rod 28 and the pushing bars 24 defining the holes 25 to establish a locking action therebetween. Thus, the present car jack 100 together with the supported car can be fixedly locked generally on the desired lifted level thereby to avoid damage to the car or injury to the driver due to the unintentional lowering of the car.

In addition to the manually-operated hydraulic system as shown by FIGS. 3 and 4, it is obvious to those skilled in the art that the piston 122 of the present car jack 100 can also be driven by an electrically-operated hydraulic system.

In a further possible embodiment of the present invention, the lever 18 may be made to have a size the same as that of the locking rod 28; thus, the locking rod 28 is no longer necessary. In this case, after the driver has used the present car jack 100 to lift the car to a desired level by inserting the lever 18 into the socket 14 and causing the former to have a well known reciprocating movement relative to the latter, the driver may pull the lever 18 out of the socket 14 and insert it into the holes 25 defined in the pushing bars 24 to extend therethrough, thereby locking the present car jack 100 and the lifted car generally at the desired level.

Although it is not shown by the present application, it can be easily understood by those skilled in the art that a threaded frame-type car jack which has a threaded shaft functioning the same as that of the piston 122 of the present car jack 100 and driven by a rotating action can also be provided with the holes 25 in a pair of pushing bars thereof. The holes in the pushing bars of the threaded frame-type car jack also cooperate with a locking rod extending therethrough to prevent an unintentional lowering of a heavy load supported by the threaded frame-type car jack.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A frame-type car jack, comprising:

a base;

means mounted on the base for generating a lifting force in a direction substantially vertical to the base when said lifting force generating means receives an external force;

a pair of pulling bars pivotally connected to said lifting force generating means;

a pair of links pivotally connected to the pulling bars and to the base;

a pair of pushing bars pivotally connected to the links and defining a pair of aligned holes thereon;

a load-engaging head pivotally connected to the pair of pushing bars and adapted to contact with a heavy load intended to be lifted; and a locking rod to be inserted into and extended through the pair of aligned holes defined in the pair of pushing bars and having a cross-sectional dimension substantially equal to the size of the pair of aligned holes, for fixedly engaging the pair of pushing bars when an unintentional lowering of the car jack occurs, whereby when the heavy load is lifted by the car jack to a desired level, the locking rod can fixedly lock the car jack with the lifted heavy load substantially at the desired level.

2. A frame-type car jack according to claim 1, wherein said lifting force generating means is a hydraulic driving system comprising a hydraulic oil cylinder fixedly mounted on the base and a piston slideably mounted on the cylinder, said pulling bars being pivotably connected to the piston.

3. A frame-type car jack according to claim 1, wherein said lifting force generating means is a threaded driving system comprising a threaded shaft driven by a rotating action as the external force, said pulling bars being pivotably connected to the threaded shaft.

4. A frame-type car jack according to claim 2, wherein the hydraulic driving system is manually operated.

5. A frame-type car jack according to claim 4, wherein the manually-operated hydraulic driving system comprises a socket and a lever for the hydraulic driving system to receive a manual force as the external force and wherein the lever has a dimension substantially the same as that of the locking rod so that the lever can also be used to have the function of the locking rod.

6. A frame-type car jack according to claim 2, wherein the hydraulic driving system is electrically operated.

* * * * *